US010681389B2

(12) United States Patent
Henry et al.

(10) Patent No.: US 10,681,389 B2
(45) Date of Patent: *Jun. 9, 2020

(54) METHOD OF CODING AND DECODING IMAGES, CODING AND DECODING DEVICE AND COMPUTER PROGRAMS CORRESPONDING THERETO

(71) Applicant: DOLBY INTERNATIONAL AB, Amsterdam Zuidoost (NL)

(72) Inventors: Felix Henry, Saint Gregoire (FR); Gordon Clare, Pace (FR)

(73) Assignee: Dolby International AB, Amsterdam Zuidoost (NL)

( * ) Notice: Subject to any disclaimer, the term of this patent is extended or adjusted under 35 U.S.C. 154(b) by 0 days.

This patent is subject to a terminal disclaimer.

(21) Appl. No.: 16/178,910

(22) Filed: Nov. 2, 2018

(65) Prior Publication Data
US 2019/0075326 A1    Mar. 7, 2019

Related U.S. Application Data

(63) Continuation of application No. 15/187,585, filed on Jun. 20, 2016, now Pat. No. 10,142,660, which is a
(Continued)

(30) Foreign Application Priority Data

Nov. 7, 2011  (FR) ...................... 11 60109

(51) Int. Cl.
*H04N 19/91* (2014.01)
*H04N 19/176* (2014.01)
(Continued)

(52) U.S. Cl.
CPC ........... *H04N 19/91* (2014.11); *H04N 19/105* (2014.11); *H04N 19/117* (2014.11);
(Continued)

(58) Field of Classification Search
CPC .... H04N 19/91; H04N 19/172; H04N 19/159; H04N 19/122; H04N 19/119;
(Continued)

(56) References Cited

U.S. PATENT DOCUMENTS 7,046,807 B2    5/2006 Hirano et al.
7,379,608 B2    5/2008 Marpe et al.
(Continued)

FOREIGN PATENT DOCUMENTS

CN    1595454    3/2005
CN    1642278    7/2005
(Continued)

OTHER PUBLICATIONS

Amonou et al., "Video coding technology proposal by France Telecom, NTT, NTT DoCoMo, Panasonic and Technicolor", 1st JCTVC meeting, Dresden, Apr. 2010 (JCTVC-A114), 42 pages.
(Continued)

*Primary Examiner* — Joseph W Becker

(57) ABSTRACT

A method for encoding an image having been cut up into partitions. The method includes: predicting data of a current partition based on an already encoded and then decoded reference partition, generating a predicted partition; determining residual data by comparing data relating to the current partition with the predicted partition, the residual data associated with various digital data items. Prior producing a signal containing the encoded information, performing the following steps: determining, from the predetermined residual data, a subset containing residual data capable of being modified; calculating the value of a function representative of the residual data; comparing the calculated value with a value of at least one of the digital data items; based on the comparison, modification or non-modification of at least one of the residual data items of the
(Continued)

subset; and, in the event of a modification, entropy encoding the at least one modified residual data item.

2 Claims, 4 Drawing Sheets

Related U.S. Application Data continuation of application No. 15/004,174, filed on Jan. 22, 2016, now Pat. No. 9,628,826, which is a continuation of application No. 14/665,163, filed on Mar. 23, 2015, now Pat. No. 9,277,240, which is a continuation of application No. 14/492,829, filed on Sep. 22, 2014, now Pat. No. 9,001,888, which is a continuation of application No. 14/356,799, filed as application No. PCT/FR2012/052552 on Nov. 6, 2012, now Pat. No. 9,374,599.

(51) Int. Cl.

| | | |
|---|---|---|
| H04N 19/463 | (2014.01) | |
| H04N 19/467 | (2014.01) | |
| H04N 19/117 | (2014.01) | |
| H04N 19/18 | (2014.01) | |
| H04N 19/48 | (2014.01) | |
| H04N 19/147 | (2014.01) | |
| H04N 19/46 | (2014.01) | |
| H04N 19/14 | (2014.01) | |
| H04N 19/44 | (2014.01) | |
| H04N 19/124 | (2014.01) | |
| H04N 19/13 | (2014.01) | |
| H04N 19/593 | (2014.01) | |
| H04N 19/184 | (2014.01) | |
| H04N 19/105 | (2014.01) | |
| H04N 19/119 | (2014.01) | |
| H04N 19/122 | (2014.01) | |
| H04N 19/159 | (2014.01) | |
| H04N 19/172 | (2014.01) | |

(52) U.S. Cl.
CPC ......... *H04N 19/119* (2014.11); *H04N 19/122* (2014.11); *H04N 19/124* (2014.11); *H04N 19/13* (2014.11); *H04N 19/14* (2014.11); *H04N 19/147* (2014.11); *H04N 19/159* (2014.11); *H04N 19/172* (2014.11); *H04N 19/176* (2014.11); *H04N 19/18* (2014.11); *H04N 19/184* (2014.11); *H04N 19/44* (2014.11); *H04N 19/46* (2014.11); *H04N 19/463* (2014.11); *H04N 19/467* (2014.11); *H04N 19/48* (2014.11); *H04N 19/593* (2014.11)

(58) Field of Classification Search
CPC .... H04N 19/105; H04N 19/184; H04N 19/48; H04N 19/117; H04N 19/18; H04N 19/13; H04N 19/593; H04N 19/124; H04N 19/14; H04N 19/44; H04N 19/147; H04N 19/467; H04N 19/463; H04N 19/176; H04N 19/46
See application file for complete search history.

(56) References Cited

U.S. PATENT DOCUMENTS

| | | | |
|---|---|---|---|
| 7,627,467 B2 | 12/2009 | Florencio et al. | |
| 8,315,310 B2 | 11/2012 | Shi | |
| 8,767,824 B2 | 7/2014 | Misra et al. | |
| 8,804,826 B2 | 8/2014 | Zan | |
| 9,001,888 B2 | 4/2015 | Henry et al. | |
| 9,008,184 B2 | 4/2015 | Wang | |
| 9,363,512 B2 | 6/2016 | Campbell | |
| 9,374,599 B2 | 6/2016 | Henry | |
| 2004/0228404 A1 | 11/2004 | Yu | |
| 2004/0240559 A1 | 12/2004 | Prakasam et al. | |
| 2005/0123207 A1 | 6/2005 | Marpe et al. | |
| 2007/0080832 A1 | 4/2007 | Yang et al. | |
| 2007/0253479 A1 | 11/2007 | Mukherjee | |
| 2008/0084929 A1 | 4/2008 | Li | |
| 2008/0246637 A1 | 10/2008 | Chen et al. | |
| 2009/0003446 A1 | 1/2009 | Wu et al. | |
| 2009/0196517 A1 | 8/2009 | Divorra | |
| 2009/0232204 A1 | 9/2009 | Lee | |
| 2009/0296806 A1 | 12/2009 | Hsu et al. | |
| 2010/0014584 A1 | 1/2010 | Feder et al. | |
| 2010/0135416 A1 | 6/2010 | Huang et al. | |
| 2011/0216824 A1 | 9/2011 | Yagasaki et al. | |
| 2012/0106647 A1 | 5/2012 | Jung | |
| 2012/0224631 A1 | 9/2012 | Jung | |
| 2012/0230417 A1 | 9/2012 | Sole Rojals et al. | |
| 2012/0230418 A1 | 9/2012 | Sole Rojals et al. | |
| 2013/0107969 A1* | 5/2013 | Nguyen .................. | H04N 19/70 375/240.18 |
| 2013/0188725 A1 | 7/2013 | Wang et al. | |
| 2013/0336409 A1 | 12/2013 | He et al. | |
| 2014/0233655 A1 | 8/2014 | Jung | |
| 2014/0301462 A1 | 10/2014 | Gu | |
| 2014/0314144 A1 | 10/2014 | Henry et al. | |
| 2014/0348223 A1 | 11/2014 | Henry et al. | |
| 2014/0348237 A1 | 11/2014 | Thiesse | |
| 2015/0010076 A1 | 1/2015 | Henry et al. | |
| 2015/0010089 A1 | 1/2015 | Henry et al. | |
| 2015/0195568 A1 | 7/2015 | Henry et al. | |
| 2019/0238878 A1 | 8/2019 | Henry et al. | |

FOREIGN PATENT DOCUMENTS

| | | |
|---|---|---|
| CN | 1677438 | 10/2005 |
| CN | 1798346 | 7/2006 |
| CN | 1878311 | 12/2006 |
| CN | 101044762 | 9/2007 |
| CN | 101137047 | 3/2008 |
| CN | 101194427 | 6/2008 |
| CN | 101371448 | 2/2009 |
| CN | 101583045 | 11/2009 |
| CN | 101822063 | 9/2010 |
| CN | 101917625 | 12/2010 |
| CN | 101944362 | 1/2011 |
| EP | 2618572 | 7/2013 |
| FR | 2920929 | 3/2009 |
| GB | 2360915 | 10/2001 |
| HK | 1221837 | 6/2017 |
| JP | 2001-231017 | 8/2001 |
| JP | 2003319164 | 11/2003 |
| JP | 2004-080756 | 3/2004 |
| JP | 2010074242 | 4/2010 |
| JP | 2010-539744 | 12/2010 |
| JP | 4726141 | 7/2011 |
| JP | 2014-539392 | 11/2012 |
| KR | 20080105184 | 12/2008 |
| KR | 101982824 | 5/2019 |
| RU | 2330325 | 7/2008 |
| RU | 2413360 | 2/2011 |
| WO | WO 2005-004494 | 1/2005 |
| WO | WO 2006-117769 | 11/2006 |
| WO | WO2006119443 | 11/2006 |
| WO | WO2009/151232 | 12/2009 |

OTHER PUBLICATIONS

Bossen, "Common test conditions and software reference configurations," 6th JCTVC meeting, Torino, Jul. 2011 (JCTVC-F900), 4 pages.
Bross et al., "WD4: Working Draft 4 of High Efficiency Video Coding," International Organisation for Standardisation (ISO/IEC JTC1/SC29/WG11), Jul. 2011, Torino, IT, 229 pages.

(56) References Cited

OTHER PUBLICATIONS

Clare et al., "Sign Data Hiding," JCTVC-G271, 7th Meeting: Geneva, CH, Nov. 21-30, 2011, 9 pages.
Cohen et al., "Low Complexity Embedding of Information in Transform Coefficients", 5th JCTVC meeting, Geneva, Mar. 2011(JCTVC-E428), 7 pages.
Hadar et al., "Rate distortion optimization for efficient watermarking in the OCT domain", Broadband Multimedia Systems and Broadcasting, 2008 IEEE International Symposium on, IEEE, Piscataway, NJ, USA, Mar. 31, 2008 (Mar. 31, 2008), pp. 1-8, XP031268612.
Kim et al., "Data Hiding on H.264/AVC Compressed Video", Image Analysis and Recognition; [Lecture Notes in Computer Science], Springer Berlin Heidelberg, Berlin, Heidelberg, pp. 698-707, XP019097872.
Li et al., "A Reversible Data Hiding Scheme for JPEG Images", Sep. 31, 2010 (Sep. 21, 2010), Advances in Multimedia Information Processin—PCM 2010, Springer Berlin Heidelberg, Berlin, Heidelberg, pp. 653-664, XP019151677.
Ma et al., "A Data Hiding Algorithm for H.264/AVC Video Steams Without Intra-Frame Distortion Drift", IEEE Transactions on Circuits and Systems for Video Technology, IEEE Service Center, Piscataway, NJ, US, vol. 20, No. 10, Oct. 1, 2010 (Oct. 1, 2010), pp. 1320-1330, XP011317382.
Paruchuri et al., "Joint optimization of data hiding and video compression", Circuits and Systems, 2008. ISCAS 2008. IEEE International Symposium on, IEEE, Piscataway, NJ, USA, May 18, 2008 (May 18, 2008), pp. 3021-3024, XP031392649.
Sole et al., "Transform Coefficient Coding in HEVC," IEEE Transactions on Circuits and Systems for Video Technology, Dec. 2012, 22(12):1765-1777.
Thiesse et al., "Rate Distortion Data Hiding of Motion Vector Competition Information in Chroma and Luma Samples for Video Compression", IEEE Transactions on Circuits and Systems for Video Technology, IEEE Service Center, Piscataway, NJ, US, vol. 21, No. 6, Jun. 1, 2011 (Jun. 1, 2011), pp. 729-741, XP011325921.
Thiesse et al., "Data hiding of Intra prediction information in chroma samples for video compression," Proc. IEEE International Conference on Image Processing, ICIP 2010, pp. 2861-2864, Hong Kong, Sep. 2010.
Xiaojing et al., "A data hiding algorithm for H.264/AVC videos streams without intra-frame distortion drift," IEEE, Oct. 2010, 20(10):1320-1330.
Zou et al., H. 264 stream replacement watermarking with CABAC encoding. IEEE ICME, Jul. 2010, pp. 117-121.
International Search Report and Written Opinion dated Nov. 6, 2012 for corresponding International Application No. PCT/FR2012/052552 filed Jun. 11, 2012, 28 pages (with English translation).
International Search Report and Written Opinion dated Jan. 31, 2013 for corresponding International Application No. PCT/FR2012/052551, filed Jun. 11, 2012, 25 pages (with English translation).
European Search Report in European Application No. 15185078.1, dated Feb. 1, 2016, 7 pages.
Korean Office Action issued in Application No. 10-2014-7015526 dated Feb. 29, 2016, with English Translation, 9 pages.
Russian Office Action issued in Application No. 2014123342, dated Feb. 10, 2016, with English Translation, 8 pages.
Office Action issued in U.S. Appl. No. 14/492,829 dated Jan. 5, 2015, 11 pages.
Notice of Allowance issued in U.S. Appl. No. 14/492,829 dated Feb. 27, 2015, 7 pages.
Office Action issued in U.S. Appl. No. 14/356,804, dated Nov. 28, 2014, 17 pages.
Office Action issued in U.S. Appl. No. 14/492,950, dated Nov. 26, 2014, 15 pages.
Office Action issued in U.S. Appl. No. 14/356,804 dated May 8, 2015, 13 pages.
Office Action issued in U.S. Appl. No. 14/492,950 dated May 8, 2015, 13 pages.
Office Action issued in U.S. Appl. No. 14/665,163 dated Jun. 19, 2015, 15 pages.
Notice of Allowance issued in U.S. Appl. No. 14/665,163 dated Oct. 20, 2015, 6 pages.
Office Action issued in U.S. Appl. No. 14/356,799 dated Oct. 19, 2015, 19 pages.
Notice of Allowance issued in U.S. Appl. No. 14/492,950 dated Jan. 14, 2016, 10 pages.
Office Action issued in U.S. Appl. No. 15/004,174 dated Mar. 23, 2016, 11 pages.
Chinese Office Action issued in Application No. 201280066229.4, dated Nov. 1, 2016, with English Translation, 8 pages.
European Search Report, Application No. 17154805.0, dated Apr. 6, 2017 (with partial English translation).
Korean Office Action issued in Application No. 10-2016-7032247 dated Nov. 8, 2017, with English Translation, 14 pages.
Chinese Office Action issued in Application No. 201280066211.4, dated Nov. 1, 2017, with English Translation, 13 pages.
Chinese Office Action issued in Application No. 201280066211.4, dated May 18, 2017, with English Translation, 6 pages.
Japanese Office Action in Japanese Application No. 2014-539391, dated Sep. 13, 2016, with English translation, 6 pages.
Japanese Office Action in Japanese Application No. 2014-539392, dated Sep. 13, 2016, with English translation, 6 pages.
Notice of Allowance issued in KR Application No. 10-2015-7011545 dated Mar. 9, 2018, 13 pages.
Sung Min Kim et al: "Data Hiding on H.264/AVC Compressed Video", Aug. 22, 2007 (Aug. 22, 2007), Image Analysis and Recognition; [Lecture Notes in Computer Science], Springer Berlin Heidelberg, Berlin, Heidelberg.
Korean Office Action in Korean Application No. 10-2019-7014590, dated Jun. 27, 2019, 14 pages (with English translation).
Chinese Office Action in Chinese Application No. 201710760370.9, dated Jul. 8, 2019, 11 pages (with English translation).
Chinese Office Action in Chinese Application No. 201710760366.2, dated Jul. 1, 2019, 11 pages (with English translation).
Office Action issued in U.S. Appl. No. 16/377,548, dated Aug. 2, 2019.
Chinese Office Action in Chinese Application No. 201710760372.8, dated Jul. 17, 2019, 11 pages (with English translation).
Indian Office Action in Indian Application No. 3039/CHENP/2014, dated Jul. 29, 2019, 6 pages (with English translation).
Japanese Office Action in Japanese Application No. 2018-212942, dated Nov. 26, 2019, 10 pages (with English translation).
Korean Notice of Allowance in Korean Application No. 10-2019-7022616, dated Nov. 15, 2019, 6 pages (with English translation).
Chinese Office Action in Chinese Application No. 201710760368.1, dated Jun. 25, 2019, 12 pages (with English translation).
Thiesse et al., "Data hiding of Motion Information in Chroma and Luma Samples for Video Compression," 2010 IEEE International Workshop on Multimedia Signal Processing, IEEE, Dec. 10, 2010, pp. 217-221.
Chinese Office Action in Chinese Application No. 201810147654.5, dated Nov. 28, 2019, 18 pages (with English translation).
Russian Office Action in Russian Application No. 2017100690, dated Mar. 10, 2020, 17 pages (with English translation).

* cited by examiner

METHOD OF CODING AND DECODING IMAGES, CODING AND DECODING DEVICE AND COMPUTER PROGRAMS CORRESPONDING THERETO

CROSS-REFERENCE TO RELATED APPLICATIONS

This application is a continuation of U.S. patent application Ser. No. 15/187,585, filed on Jun. 20, 2016, which is a continuation of U.S. patent application Ser. No. 15/004,174, filed on Jan. 22, 2016, U.S. Pat. No. 9,628,826, which is a continuation of U.S. patent application Ser. No. 14/665,163, filed on Mar. 23, 2015, now U.S. Pat. No. 9,277,240, which is a continuation of U.S. patent Ser. No. 14/492,829, filed on Sep. 22, 2014, now U.S. Pat. No. 9,001,888, which is a continuation of U.S. Ser. No. 14/356,799, filed on May 7, 2014, now U.S. Pat. No. 9,374,599. U.S. patent application Ser. No. 14/356,799 is a Section 371 National Stage Application of International Application Serial No. PCT/FR2012/052552, filed on Nov. 6, 2012, which claims priority to Application Serial No. 1160109, filed in France on Nov. 7, 2011. The entire contents of all the foregoing applications are hereby incorporated by reference.

FIELD OF THE INVENTION

The present invention relates generally to the field of image processing, and more specifically to the encoding and decoding of digital images and of sequences of digital images.

The invention can thus, in particular, be applied to the video encoding implemented in current video encoders (MPEG, H.264, etc) or future ones (ITU-T/VCEG (H.265) or ISO/MPEG (HEVC)).

BACKGROUND OF THE INVENTION

Current video encoders (MPEG, H.264, etc) use a representation by blocks of the video sequence. The images are split into macroblocks, each macroblock is itself split into blocks and each block, or macroblock, is encoded by intra image or inter image prediction. Thus, some images are encoded by spatial prediction (intra prediction), while other images are encoded by temporal prediction (inter prediction) with respect to one or more reference encoded-decoded images, with the aid of a motion compensation known by the person skilled in the art.

For each block, there is encoded a residual block, also called prediction residue, corresponding to the original block reduced by a prediction. The residual blocks are transformed by a transform of the discrete cosine transform (DCT) type, then quantized using, for example, a scalar type quantization. Coefficients, some of which are positive and others negative, are obtained at the end of the quantization step. They are then scanned in a generally zigzag read order (as in the JPEG standard), thereby providing for exploiting the significant number of zero coefficients in the high frequencies. At the end of the aforementioned scan, a one-dimensional list of coefficients is obtained, which will be called "quantized residue".

The coefficients of this list are then encoded by an entropy encoding.

The entropy encoding (for example of the arithmetic coding or Huffman coding type) is carried out as follows:

an information item is entropically encoded in order to indicate the position of the last non-zero coefficient in the list, for each coefficient located before the last non-zero coefficient, an information item is entropically encoded in order to indicate whether or not the coefficient is zero, for each non-zero coefficient indicated previously, an information item is entropically encoded in order to indicate whether or not the coefficient is equal to one, for each coefficient that is not zero and not equal to one, and located before the last non-zero coefficient, an amplitude information item (absolute value of the coefficient, which value is reduced by two) is entropically encoded, for each non-zero coefficient, the sign assigned to it is encoded by a '0' (for the + sign) or a '1' (for the − sign).

According to the H.264 technique for example, when a macroblock is split into blocks, a data signal, corresponding to each block, is transmitted to the decoder. Such a signal comprises:

the quantized residues contained in the abovementioned list, information items representative of the encoding mode used, in particular:
the prediction mode (intra prediction, inter prediction, default prediction producing a prediction for which no information is transmitted to the decoder (called "skip");
information specifying the type of prediction (orientation, reference image, etc);
the type of partitioning;
the type of transform, for example 4×4 DCT, 8×8 DCT, etc;
the motion information if necessary;
etc.

The decoding is performed image by image, and for each image, macroblock by macroblock. For each partition of a macroblock, the corresponding elements of the stream are read. The inverse quantization and the inverse transformation of the coefficients of the blocks are performed to produce the decoded prediction residue. Then, the prediction of the partition is calculated and the partition is reconstructed by adding the prediction to the decoded prediction residue.

The intra or inter encoding by competition, as implemented in the H.264 standard, thus relies on placing various encoding information items, such as those mentioned above, in competition with the aim of selecting the best mode, i.e. the one which will optimize the encoding of the partition in question according to a predetermined performance criterion, for example the rate distortion cost that is well known to the person skilled in the art.

The information items representative of the encoding mode selected are contained in the data signal transmitted by the encoder to the decoder. The decoder is thus capable of identifying the encoding mode selected at the encoder, then applying the prediction that conforms with this mode.

The document "Data Hiding of Motion Information in Chroma and Luma Samples for Video Compression", J.-M. Thiesse, J. Jung and M. Antonini, International workshop on multimedia signal processing, 2011, presents a data hiding method implemented during a video compression.

More specifically, it is proposed to avoid including in the signal to be transmitted to the decoder at least one competition index as issued from a plurality of competition indexes to be transmitted. Such an index is for example the index MVComp which represents an information item for identifying the motion vector predictor used for a block predicted in inter mode. Such an index which can take the value 0 or 1 is not included directly in the signal of encoded data items, but transported by the parity of the sum of the coefficients of the quantized residue. An association is created between the parity of the quantized residue and the index MVComp. By way of example, an even value of the quantized residue is associated with the index MVComp of value 0, while an odd value of the quantized residue is associated with the index MVComp of value 1. Two cases can arise. In a first case, if the parity of the quantized residue already corresponds to that of the index MVComp which is desired to be transmitted, the quantized residue is encoded conventionally. In a second case, if the parity of the quantized residue is different from that of the index MVComp which is desired to be transmitted, the quantized residue is modified such that its parity is the same as that of the index MVComp. Such a modification involves incrementing or decrementing one or more coefficients of the quantized residue by an odd value (e.g. +1, −1, +3, −3, +5, −5 etc) and retaining only the modification which optimizes a predetermined criterion, in this case the previously mentioned rate distortion cost.

At the decoder, the index MVComp is not read in the signal. The decoder is satisfied simply with conventionally determining the residue. If the value of this residue is even, the index MVComp is set to 0. If the value of this residue is odd, the index MVComp is set to 1.

In accordance with the technique that has just been presented, the coefficients which undergo the modification are not always chosen optimally, such that the modification applied brings about disturbances in the signal transmitted to the decoder. Such disturbances are inevitably detrimental to the effectiveness of the video compression.

SUMMARY OF THE INVENTION

An embodiment of the present invention relates to a method for encoding at least one image split into partitions, such a method implementing the steps of:
prediction of data items of a current partition as a function of at least one reference partition already encoded then decoded, delivering a predicted partition;
determination of a set of residual data items by comparison of data items relating to the current partition and the predicted partition, the residual data items being associated respectively with various digital information items which are intended to undergo an entropy encoding,
generation of a signal containing the encoded information items.

The method according to the invention is notable in that it implements, prior to the signal generation step, the following steps:
determination, from the determined set of residual data items, of a subset containing residual data items suitable for being modified,
calculation of the value of a function representative of the residual data items of said determined subset,
comparison of the calculated value with a value of at least one of the digital information items,
depending on the result of the comparison, modification or no modification of at least one of the residual data items of the subset,
in the event of modification, entropy encoding of the at least one modified residual data item.

Such an arrangement provides for applying a data hiding technique on a reduced set of residual data items, in which set the residual data items are suitable for being modified.

According to the invention, the expression "residual data items suitable for being modified" is understood to mean data items for which the application of a modification does not bring about desynchronization between the encoder and the decoder.

Thus, in accordance with the invention, the residual data items which are intended to undergo a modification are selected much more reliably than in the previously cited prior art, thereby providing for obtaining a better quality of reconstruction of the image at the decoder.

Moreover, the possibility of modifying a reduced number of residual data items provides for accelerating the encoding.

In a particular embodiment, the steps which follow the step for determining the subset of residual data items are implemented only if a predetermined criterion, dependent on the residual data items suitable for being modified, is met.

Such an arrangement additionally enables the encoder to decide in a rational manner whether or not it is appropriate to apply a data hiding technique.

Such a decision step has the advantage of being applied only on the reduced set of residual data items suitable for being modified. It is thus ensured that the data hiding technique is applied much more appropriately than in the previously cited prior art, in particular on a better chosen number of residual data items, for which it is certain that once these data items are modified, the disturbance of the signal generated by such a modification will not have a negative impact on the quality of the reconstruction of the image at the decoder.

In another particular embodiment, the predetermined decision criterion is dependent on the result of a comparison between the number of residual data items suitable for being modified and a predetermined number.

Such an arrangement provides for improving the compression performance of the arithmetic encoder while effectively reducing the signaling cost. Specifically, this arrangement provides for precisely detecting the number of residual data items from which it is judicious to apply the data hiding technique without the latter bringing about high disturbance levels in the signal to be transmitted to the decoder.

In yet another particular embodiment, if a plurality of digital information items is considered during the comparison step, the latter entails comparing the calculated value of a function representative of the residual data items of the determined subset with the value of a function representative of the plurality of digital information items.

Such an arrangement provides for optimizing the compression performance of the arithmetic encoder while optimizing the reduction in the signaling cost, since it provides for hiding several digital information items in the signal to be transmitted to the decoder.

In yet another particular embodiment, the at least one digital information item corresponds to the sign of a residual data item.

The sign is a particularly relevant information item to be hidden due to the fact that the probability of appearance of a positive or negative sign is equiprobable. As such, given that a sign is necessarily encoded on one bit, it is thus possible, by hiding this information, to economize one bit in the signal to be transmitted to the decoder, thereby substantially reducing the signaling cost. The reduction in such a cost will be all the more higher when it is possible according to the invention to hide a plurality of signs, and therefore a plurality of bits.

Correlatively, the invention relates also to a device for encoding at least one image split into partitions, such a device comprising:

means of prediction of data items of a current partition as a function of at least one reference partition already encoded then decoded, delivering a predicted partition, means of determination of a set of residual data items suitable for comparing data items relating to the current partition and the predicted partition, the residual data items being associated respectively with various digital information items which are intended to undergo an entropy encoding, means of generation of a signal containing the encoded information items.

Such an encoding device is notable in that it comprises, upstream of the generation means, processing means which are able to:

determine, from the determined set of residual data items, a subset containing residual data items suitable for being modified, calculate the value of a function representative of the residual data items of the determined subset, compare the calculated value with a value of at least one of the digital information items, modify or not modify at least one of the residual data items of the determined subset, depending on the result of the modification, as well as means for the entropy encoding of the at least one modified residual data item, in the event of modification by the processing means.

In a corresponding way, the invention relates also to a method for decoding a data signal representative of at least one image split into partitions which has been previously encoded, comprising a step for obtaining, by the entropy decoding of data of the signal, digital information items associated with residual data items relating to at least one previously encoded partition.

Such a decoding method is notable in that it comprises the following steps:

determination, from the residual data items, of a subset containing residual data items able to have been modified during a previous encoding, calculation of the value of a function representative of the residual data items of said determined subset, obtaining of the value of at least one digital information item that is different from those obtained by entropy decoding, from the calculated value.

In a particular embodiment, the steps which follow the step for determining the subset of residual data items are implemented only if a predetermined criterion, dependent on the residual data items able to have been modified, is met.

In another particular embodiment, the predetermined decision criterion is dependent on the result of a comparison between the number of residual data items able to have been modified and a predetermined number.

In yet another particular embodiment, a plurality of values associated respectively with a plurality of digital information items that are different from those obtained by entropy decoding is obtained from said calculated value.

In yet another particular embodiment, the at least one digital information item corresponds to the sign of a residual data item.

Correlatively, the invention relates also to a device for decoding a data signal representative of at least one image split into partitions which has been previously encoded, comprising means for obtaining, by the entropy decoding of data items of the signal, digital information items associated with residual data items relating to at least one previously encoded partition.

Such a decoding device is notable in that it comprises processing means which are able to:

determine, from said residual data items, a subset containing residual data items able to have been modified during a previous encoding, calculate the value of a function representative of the residual data items of the determined subset, obtain the value of at least one digital information item that is different from those obtained by entropy decoding, from the calculated value.

The invention relates also to a computer program including instructions for the execution of the steps of the encoding or decoding method above, when the program is executed by a computer.

Such a program can use any programming language and be in the form of source code, object code or a code intermediate between source code and object code, such as in a partially compiled form or in any other desirable form.

Yet another subject of the invention is a recording medium readable by a computer and including instructions of a computer program as mentioned above.

The recording medium can be any entity or device capable of storing the program. For example, such a medium can include a storage means such as a ROM, for example a CD-ROM or a microelectronic circuit ROM, or a magnetic recording means, for example a floppy disk or a hard disk.

On the other hand, such a recording medium can be a transmittable medium such as an electrical or optical signal, which can be conveyed via an electrical or optical cable, via radio or via other means. The program according to the invention can in particular be downloaded over an Internet type network.

Alternatively, such a recording medium can be an integrated circuit in which the program is incorporated, the circuit being adapted to execute the method in question or to be used in the execution of the latter.

The encoding device, the decoding method, the decoding device and the computer programs mentioned above exhibit at least the same advantages as those provided by the encoding method according to the present invention.

BRIEF DESCRIPTION OF THE DRAWINGS

Other features and advantages will become clear upon reading about two preferred embodiments described with reference to the drawings in which.

DETAILED DESCRIPTION OF THE ENCODING PART

An embodiment of the invention will now be described, in which the encoding method according to the invention is used to encode a sequence of images according to a binary stream close to that obtained by an encoding according to the H.264/MPEG-4 AVC standard. In this embodiment, the encoding method according to the invention is for example implemented in software or hardware form by modifications of an encoder initially compliant with the H.264/MPEG-4 AVC standard. The encoding method according to the invention is represented in the form of an algorithm including steps C1 to C40, represented in FIG. 1.

Figure 2:
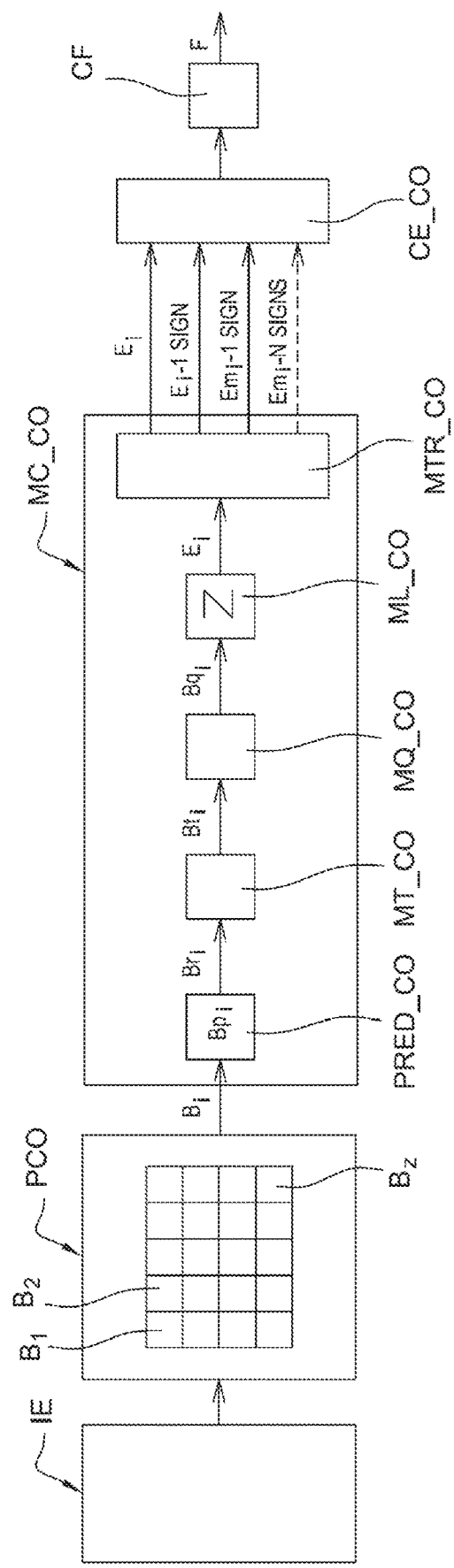
FIG. 2 represents an embodiment of an encoding device according to the invention.

According to the embodiment of the invention, the encoding method according to the invention is implemented in an encoding device or encoder CO, an embodiment of which is represented in FIG. 2.

In accordance with the invention, prior to the actual encoding step, an image IE of a sequence of images to be encoded in a predetermined order is split into a plurality Z of partitions $B_1, B_2, \ldots, B_i, \ldots, B_Z$, as represented in FIG. 2.

It is appropriate to note that in the sense of the invention, the term "partition" means coding unit. This latter terminology is notably used in the HEVC/H.265 standard being drafted, for example in the document accessible at the following Internet address: http://phenix.int-evry.fr/jct/doc_end_user/current_document.php?id=3286

In particular, such a coding unit groups together sets of rectangular or square shape pixels, also called blocks, macroblocks, or sets of pixels exhibiting other geometric shapes.

In the example represented in FIG. 2, said partitions are blocks which have a square shape and are all the same size. Depending on the size of the image, which is not necessarily a multiple of the size of the blocks, the last blocks to the left and the last blocks at the bottom are able to not be square-shaped. In an alternative embodiment, the blocks can be for example of rectangular size and/or not aligned with one another.

Each block or macroblock can moreover be itself divided into subblocks which are themselves subdividable.

Such splitting is performed by a partitioning module PCO represented in FIG. 2 which uses for example a partitioning algorithm that is well known as such.

Following said splitting step, each of the current partitions $B_i$ (where i is an integer such that $1 \leq i \leq Z$) of said image IE is encoded.

In the example represented in FIG. 2, such an encoding is applied successively to each of the blocks $B_1$ to $B_Z$ of the current image IE. The blocks are encoded for example according to a scan such as the raster scan, which is well known to the person skilled in the art.

The encoding according to the invention is implemented in an encoding software module MC_CO of the encoder CO, as represented in FIG. 2.

Figure 1:
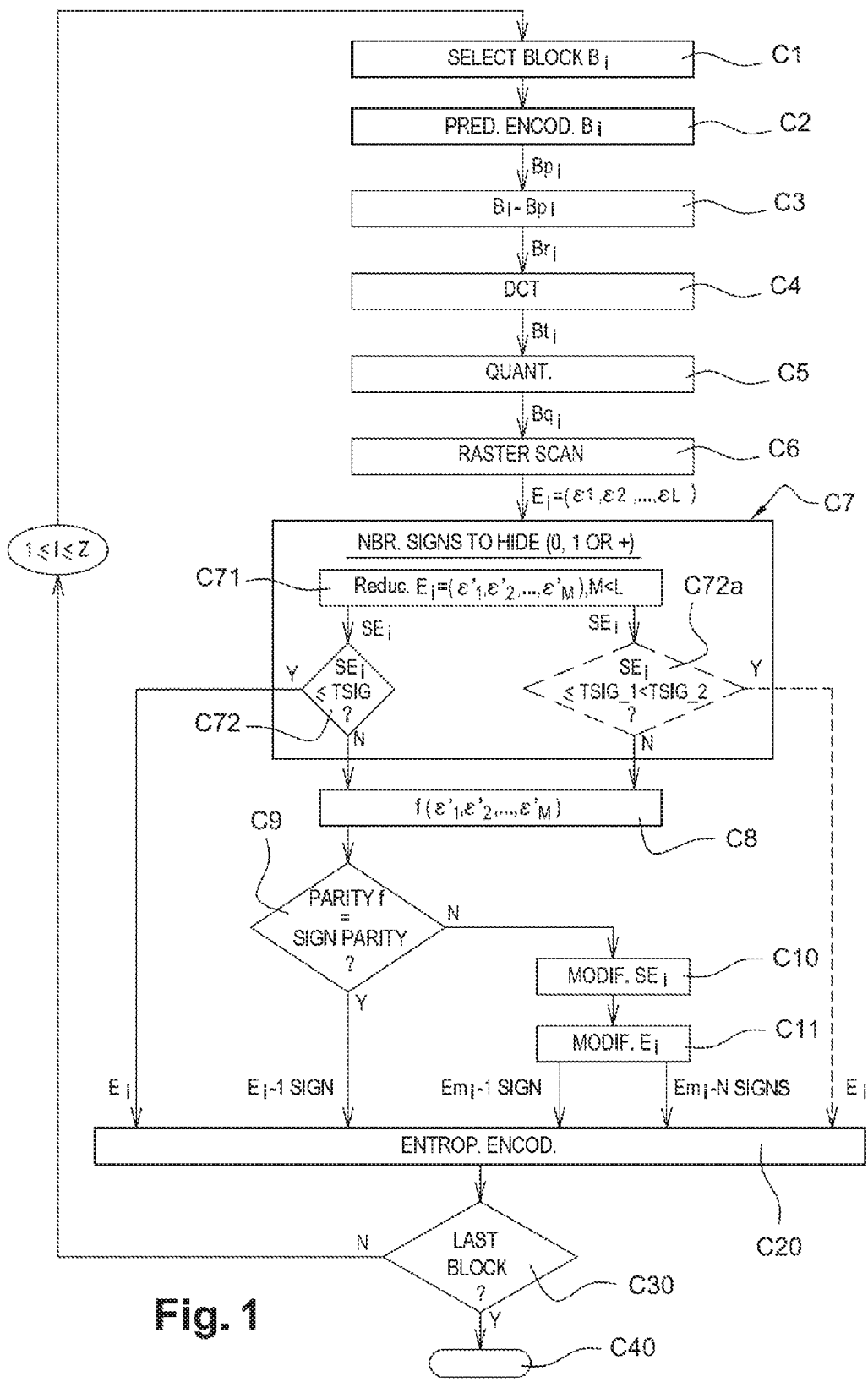
FIG. 1 represents the main steps of the encoding method according to the invention.

During a step C1 represented in FIG. 1, the encoding module MC_CO of FIG. 2 selects as current block $B_i$ the first block $B_1$ to be encoded of the current image IE. As represented in FIG. 2, this is the first lefthand block of the image IE.

During a step C2 represented in FIG. 1, the predictive encoding of the current block $B_1$ by known intra and/or inter prediction techniques is carried out, during which predictive encoding the block $B_1$ is predicted with respect to at least one previously encoded and decoded block. Such a prediction is carried out by a prediction software module PRED_CO as represented in FIG. 2.

Needless to say other intra prediction modes as proposed in the H.264 standard are possible.

The current block $B_1$ can also be subjected to a predictive encoding in inter mode, during which the current block is predicted with respect to a block from a previously encoded and decoded image. Other types of prediction can of course be envisaged. Among the predictions possible for a current block, the optimal prediction is chosen according to a rate distortion criterion that is well known to the person skilled in the art.

Said abovementioned predictive encoding step provides for constructing a predicted block $Bp_1$ which is an approximation of the current block $B_1$. The information items relating to this predictive encoding are intended to be included in a signal to be transmitted to the decoder. Such information items comprise notably the type of prediction (inter or intra), and if necessary, the intra prediction mode, the type of partitioning of a block or macroblock if the latter has been subdivided, the reference image index and the motion vector which are used in the inter prediction mode. These information items are compressed by the encoder CO.

During a next step C3 represented in FIG. 1, the prediction module PRED_CO compares the data items relating to the current block $B_1$ with the data items of the predicted block $Bp_1$. More specifically, during this step, conventionally the predicted block $Bp_1$ is subtracted from the current block $B_1$ to produce a residual block $Br_1$.

During a next step C4 represented in FIG. 1, the residual block $Br_1$ is transformed according to a conventional direct transform operation such as for example a DCT type discrete cosine transform, to produce a transformed block $Bt_1$. Such an operation is executed by a transform software module MT_CO, as represented in FIG. 2.

During a next step C5 represented in FIG. 1, the transformed block $Bt_1$ is quantized according to a conventional quantization operation, such as for example a scalar quantization. A block $Bq_1$ of quantized coefficients is then obtained. Such a step is executed by means of a quantization software module MQ_CO, as represented in FIG. 2.

During a next step C6 represented in FIG. 1, the quantized coefficients of the block $Bq_1$ are scanned in a predefined order. In the example represented, this is a conventional zigzag scan. Such a step is executed by a read software module ML_CO, as represented in FIG. 2. At the end of step C6, a one-dimensional list $E_1 = (\varepsilon 1, \varepsilon 2, \ldots, \varepsilon L)$ of coefficients is obtained, more commonly known as "quantized residue", where L is an integer greater than or equal to 1. Each of the coefficients in the list $E_1$ is associated with different digital information items which are intended to undergo an entropy encoding. Such digital information items are described below by way of example.

Assume that in the example represented, L=16 and that the list $E_1$ contains the following sixteen coefficients: $E_1 = (0, +9, -7, 0, 0, +1, 0, -1, +2, 0, 0, +1, 0, 0, 0, 0)$.

In this particular case:
- for each coefficient located before the last non-zero coefficient in the list $E_1$, a digital information item, such as a bit, is intended to be entropically encoded to indicate whether or not the coefficient is zero: if the coefficient is zero, it is for example the bit of value 0 which will be encoded, while if the coefficient is not zero, it is the bit of value 1 which will be encoded;
- for each non-zero coefficient +9, −7, +1, −1, +2, +1, a digital information item, such as a bit, is intended to be entropically encoded to indicate whether or not the absolute value of the coefficient is equal to one: if it is equal to 1, it is for example the bit of value 1 which will be encoded, while if it is not equal to 1, it is the bit of value 0 which will be encoded;
- for each non-zero coefficient and for which the absolute value is not equal to one and which is located before the last non-zero coefficient, such as the coefficients of value +9, −7, +2, an amplitude information item (absolute value of the coefficient at which the value two is subtracted) is entropically encoded;

for each non-zero coefficient, the sign assigned to it is encoded by a digital information item, such as a bit for example set to '0' (for the + sign) or set to '1' (for the − sign).

With reference to FIG. 1, the specific encoding steps according to the invention will now be described.

In accordance with the invention, it is decided to avoid entropically encoding at least one of the abovementioned information items. For the reasons explained earlier in the description, in a preferred embodiment, it is decided to not entropically encode at least one sign of one of said coefficients in the list $E_1$.

By way of alternative example, it could notably be decided to entropically encode the least significant bit of the binary representation of the amplitude of the first non-zero coefficient in said list $E_1$.

To this end, during a step C7 represented in FIG. 1, the number of signs to hide during the later entropy encoding step is chosen. Such a step is executed by a processing software module MTR_CO, as represented in FIG. 2.

In the preferred embodiment, the number of signs to be hidden is one or zero. Additionally, in accordance with said preferred embodiment, it is the sign of the first non-zero coefficient which is intended to be hidden. In the example represented, it is therefore the sign of the coefficient $\varepsilon 2=+9$ that is hidden.

In an alternative embodiment, the number of signs to be hidden is either zero, one, two, three or more.

In accordance with the preferred embodiment of step C7, during a first substep C71 represented in FIG. 1, a sublist $SE_1$ containing coefficients suitable for being modified, $\varepsilon'1, \varepsilon'2, \ldots, \varepsilon'M$ where M<L, is determined from said list $E_1$. Such coefficients will be called modifiable coefficients hereafter in the description.

According to the invention, a coefficient is modifiable if the modification of its quantized value does not cause desynchronization at the decoder, once this modified coefficient is processed by the decoder. Thus, the processing module MTR_CO is configured initially to not modify:

the zero coefficient or coefficients located before the first non-zero coefficient such that the decoder does not affect the value of the sign hidden at this or these zero coefficients, and for reasons of computation complexity, the zero coefficient or coefficients located after the last non-zero coefficient.

In the example represented, at the end of substep C71, the sublist $SE_1$ obtained is such that $SE_1=(9,-7,0,0,1,0,-1,2,0,0,1)$. Consequently, eleven modifiable coefficients are obtained.

During a next substep C72 represented in FIG. 1, the processing module MTR_CO proceeds with the comparison of the number of modifiable coefficients with a predetermined threshold TSIG. In the preferred embodiment, TSIG has the value 4.

If the number of modifiable coefficients is less than the threshold TSIG, then during a step C20 represented in FIG. 1, a conventional entropy encoding of the coefficients in the list $E_1$ is carried out, such as that performed for example in a CABAC encoder, denoted by the reference CE_CO in FIG. 2. To this end, the sign of each non-zero coefficient in the list $E_1$ is entropically encoded.

If the number of modifiable coefficients is greater than the threshold TSIG, then during a step C8 represented in FIG. 1, the processing module MTR_CO calculates the value of a function f which is representative of the coefficients in the sublist $SE_1$.

In the preferred embodiment in which only one sign is intended to be hidden in the signal to be transmitted to the decoder, the function f is the parity of the sum of the coefficients in the sublist $SE_1$.

During a step C9 represented in FIG. 1, the processing module MTR_CO checks whether the parity of the value of the sign to be hidden corresponds to the parity of the sum of the coefficients in the sublist $SE_1$, according to a convention defined beforehand at the encoder CO.

In the example proposed, said convention is such that a positive sign is associated with a bit of value equal to zero, while a negative sign is associated with a bit of value equal to one.

If, in accordance with the convention adopted in the encoder CO according to the invention, the sign is positive, which corresponds to an encoding bit value of zero, and if the sum of the coefficients in the sublist $SE_1$ is even, then step C20 for the entropy encoding of the coefficients in the aforementioned list $E_1$ is carried out, with the exception of the sign of the coefficient 2.

If, still in accordance with the convention adopted in the encoder CO according to the invention, the sign is negative, which corresponds to an encoding bit value of one, and if the sum of the coefficients in the sublist $SE_1$ is odd, then also step C20 for the entropy encoding of the coefficients in the aforementioned list $E_1$ is carried out, with the exception of the sign of the coefficient $\varepsilon 2$.

If, in accordance with the convention adopted in the encoder CO according to the invention, the sign is positive, which corresponds to an encoding bit value of zero, and if the sum of the coefficients in the sublist $SE_1$ is odd, then during a step C10 represented in FIG. 1, at least one modifiable coefficient in the sublist $SE_1$ is modified.

If, still in accordance with the convention adopted in the encoder CO according to the invention, the sign is negative, which corresponds to an encoding bit value of one, and if the sum of the coefficients in the sublist $SE_1$ is even, then also at step C10, at least one modifiable coefficient in the sublist $SE_1$ is modified.

Such a modification operation is carried out by the processing module MTR_CO in FIG. 2.

In the example embodiment in which $SE_1=(+9,-7,0,0,+1,0,-1,+2,0,0,+1)$, the total sum f of the coefficients is equal to 5, and is therefore odd. In order that the decoder can reconstruct the positive sign assigned to the first non-zero coefficient $\varepsilon 2=+9$, without the encoder CO having to transmit this coefficient to the decoder, the parity of the sum must become even. Consequently, the processing module MTR_CO tests, during said step C10, various modifications of coefficients in the sublist $SE_1$, all aiming to change the parity of the sum of the coefficients. In the preferred embodiment, +1 or −1 is added to each modifiable coefficient and a modification is selected from among those which are carried out.

In the preferred embodiment, such a selection forms the optimal prediction according to a performance criterion which is for example the rate distortion criterion that is well known to the person skilled in the art. Such a criterion is expressed by equation (1) below:

$$J=D+\lambda R \quad (1)$$

where D represents the distortion between the original macroblock and the reconstructed macroblock, R represents the encoding cost in bits of the encoding information items and λ represents a Lagrange multiplier, the value of which can be fixed prior to the encoding.

In the example proposed, the modification which brings about an optimal prediction according to the abovementioned rate distortion criterion is the addition of the value 1 to the second coefficient −7 in the sublist $SE_1$.

At the end of step C10, a modified sublist is hence obtained, $SEm_1$=(+9,−6,0,0,+1,0,−1,+2,0,0,+1).

It is appropriate to note that during this step, certain modifications are prohibited. Thus, in the case in which the first non-zero coefficient ε2 would have the value +1, it would not have been possible to add −1 to it, since it would have become zero, and it would then have lost its characteristic of first non-zero coefficient in the list $E_1$. The decoder would then have later attributed the decoded sign (by calculation of the parity of the sum of the coefficients) to another coefficient, and there would then have been a decoding error.

During a step C11 represented in FIG. 1, the processing module MTR_CO carries out a corresponding modification of the list $E_1$. The next modified list $Em_1$=(0,+9,−6,0,0,+1,0,−1,+2,0,0,+1,0,0,0,0) is then obtained.

Then step C20 for the entropy encoding of the coefficients in the aforementioned list $Em_1$ is carried out, with the exception of the sign of the coefficient ε2, which is the + sign of the coefficient 9 in the proposed example, which sign is hidden in the parity of the sum of the coefficients.

It is appropriate to note that the set of amplitudes of the coefficients in the list $E_1$ or in the modified list $Em_1$ is encoded before the set of signs, with the exclusion of the sign of the first non-zero coefficient ε2 which is not encoded, as has been explained above.

During a next step C30 represented in FIG. 1, the encoding module MC_CO in FIG. 2 tests whether the current encoded block is the last block of the image IE.

If the current block is the last block of the image IE, then during a step C40 represented in FIG. 1, the encoding method is ended.

If this is not the case, the next block $B_i$ is selected, which is then encoded in accordance with the order of the previously mentioned raster scan, by repeating steps C1 to C20, for 1≤i≤Z.

Once the entropy encoding of all the blocks $B_1$ to $B_Z$ is carried out, a signal F is constructed, representing, in binary form, said encoded blocks.

The construction of the binary signal F is implemented in a stream construction software module CF, as represented in FIG. 2.

The stream F is then transmitted via a communication network (not represented) to a remote terminal. The latter includes a decoder which will be described further in detail later in the description.

There will now be described, mainly with reference to FIG. 1, another embodiment of the invention.

This other embodiment is distinguished from the previous one only by the number of coefficients to be hidden which is either 0, or N, where N is an integer such that N≥2.

To this end, previously mentioned comparison substep C72 is replaced by substep C72a represented in dotted-line in FIG. 1, during which the number of modifiable coefficients is compared with several predetermined thresholds 0<TSIG_1<TSIG_2<TSIG_3 . . . , in such a way that if the number of modifiable coefficients is between TSIG_N and TSIG_N+1, N signs are intended to be hidden.

If the number of modifiable coefficients is less than the first threshold TSIG_1, then during abovementioned step C20, conventional entropy encoding of the coefficients in the list $E_1$ is carried out. To this end, the sign of each non-zero coefficient in the list $E_1$ is entropically encoded.

If the number of modifiable coefficients is between the threshold TSIG_N and TSIG_N+1, then during a step C8 represented in FIG. 1, the processing module MTR_CO calculates the value of a function f which is representative of the coefficients in the sublist $E_1$.

In this other embodiment, since the decision at the encoder is to hide N signs, the function f is the modulo $2^N$ remainder of the sum of the coefficients in the sublist $SE_1$. It is assumed in the proposed example that N=2, the two signs to be hidden being the two first signs of the two first non-zero coefficients respectively, i.e. ε2 and ε3.

During next step C9 represented in FIG. 1, the processing module MTR_CO verifies whether the configuration of the N signs, i.e. $2^N$ possible configurations, corresponds to the value of the modulo $2^N$ remainder of the sum of the coefficients in the sublist $SE_1$.

In the example proposed where N=2, there are $2^2$=4 different configurations of signs.

These four configurations comply with a convention at the encoder CO, which convention is for example determined as follows:
- a remainder equal to zero corresponds to two consecutive positive signs: +, +;
- a remainder equal to one corresponds to, consecutively, a positive sign and a negative sign: +, −;
- a remainder equal to two corresponds to, consecutively, a negative sign and a positive sign: −, +;
- a remainder equal to three corresponds to two consecutive negative signs: −, −.

If the configuration of N signs corresponds to the value of the modulo $2^N$ remainder of the sum of the coefficients in the sublist $SE_1$, then step C20 for the entropy encoding of the coefficients in the abovementioned list $E_1$ is carried out, with the exception of the sign of the coefficient ε2 and of the coefficient ε3, which signs are hidden in the parity of the modulo $2^N$ sum of the coefficients.

If this is not the case, then step C10 for modifying at least one modifiable coefficient in the sublist $SE_1$ is carried out. Such a modification is executed by the processing module MTR_CO in FIG. 2 in such a way that the modulo $2^N$ remainder of the sum of the modifiable coefficients in the sublist $SE_1$ attains the value of each of the two signs to be hidden.

During previously mentioned step C11, the processing module MTR_CO carries out a corresponding modification of the list $E_1$. A modified list $Em_1$ is hence obtained.

Then step C20 for the entropy encoding of the coefficients in the aforementioned list $Em_1$ is carried out, with the exception of the sign of the coefficient ε2 and the sign of the coefficient ε3, which signs are hidden in the parity of the modulo $2^N$ sum of the coefficients.

Detailed Description of the Decoding Part

An embodiment of the decoding method according to the invention will now be described, in which the decoding method is implemented in software or hardware form by modifications of a decoder initially compliant with the H.264/MPEG-4 AVC standard.

Figure 3:
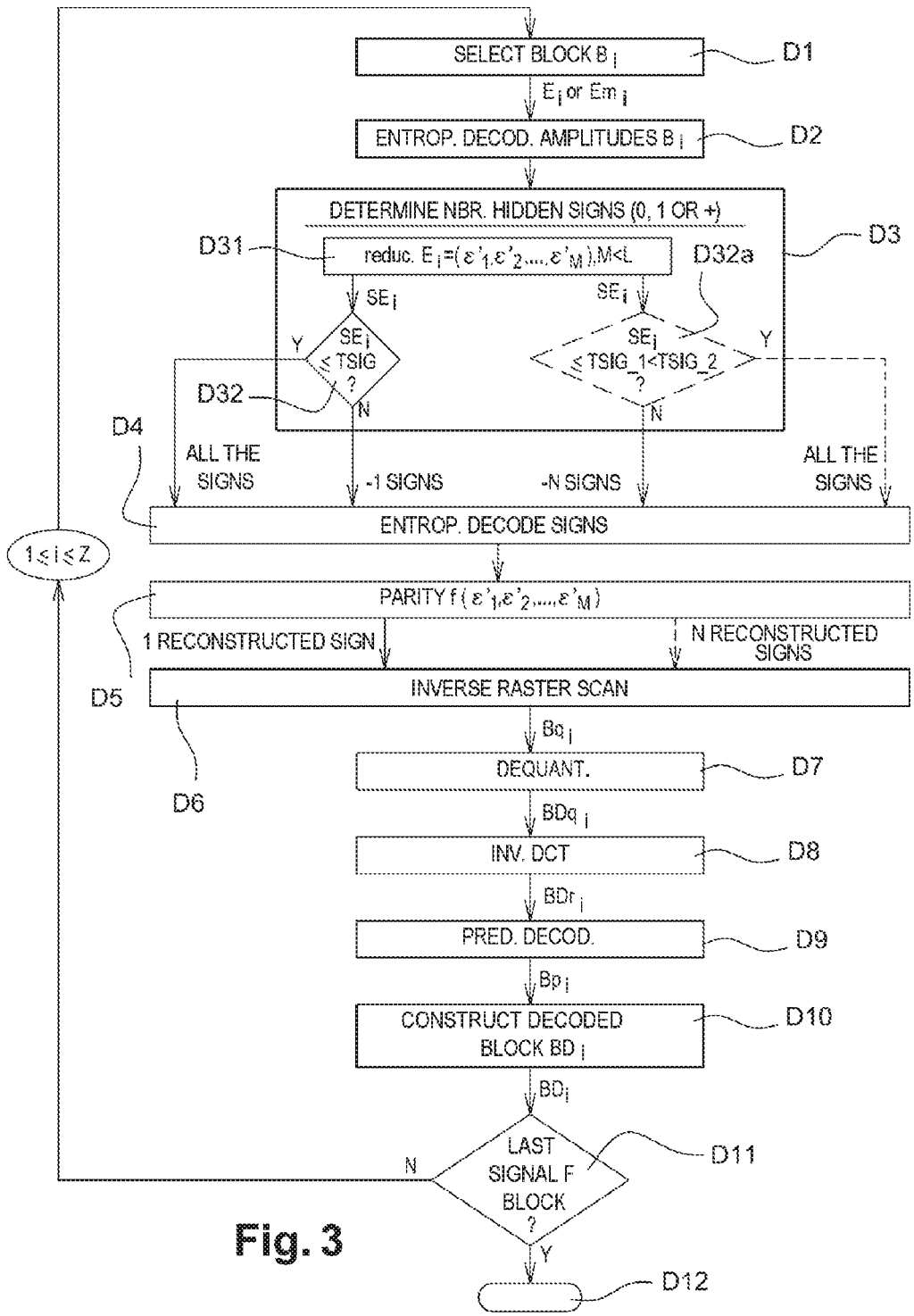
FIG. 3 represents the main steps of the decoding method according to the invention.

The decoding method according to the invention is represented in the form of an algorithm including steps D1 to D12, represented in FIG. 3.

Figure 4:
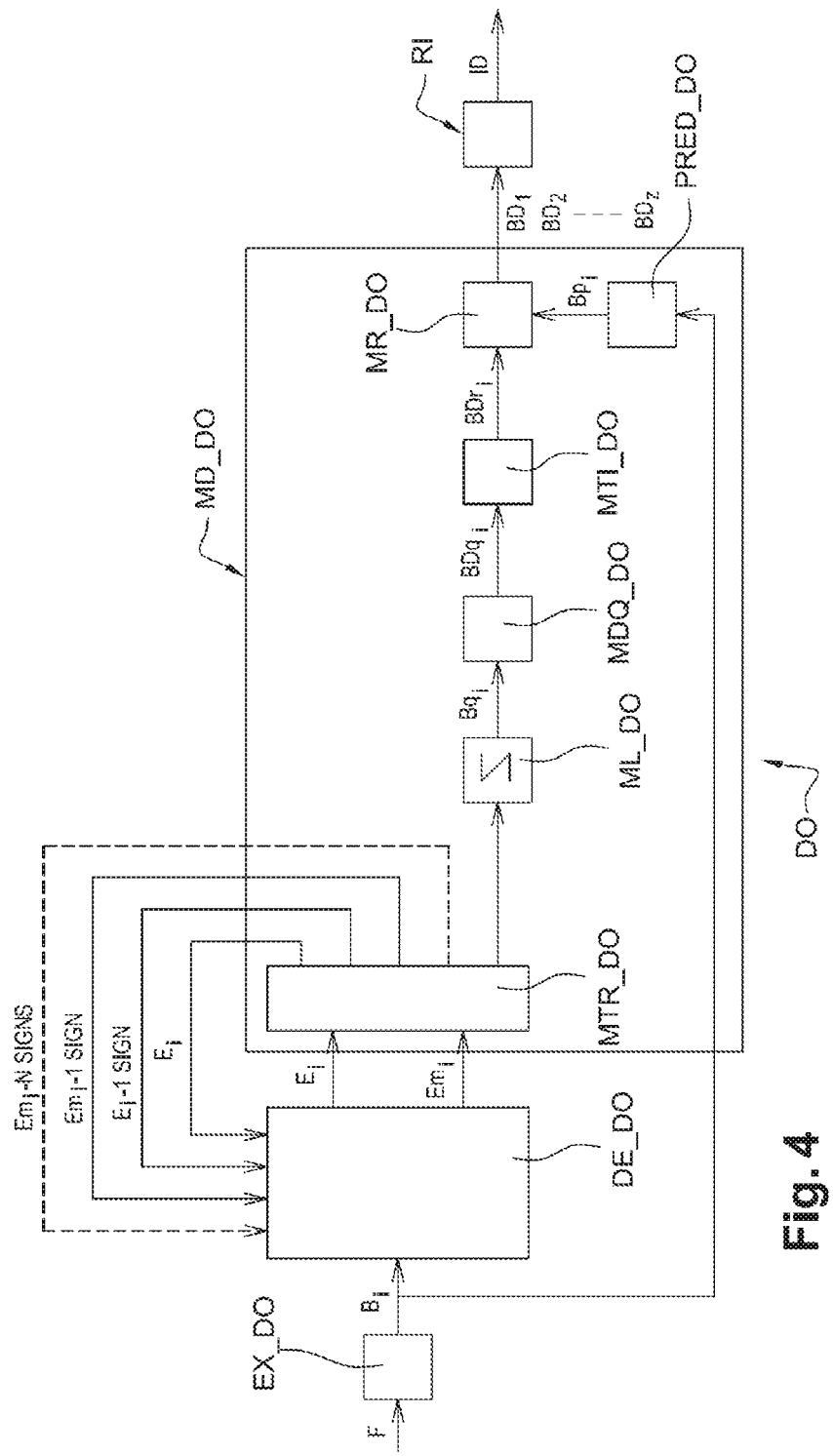
FIG. 4 represents an embodiment of a decoding device according to the invention.

According to the embodiment of the invention, the decoding method according to the invention is implemented in a decoding device or decoder DO, as represented in FIG. 4.

During a preliminary step not represented in FIG. 3, in the received data signal F, the partitions $B_1$ to $B_Z$ which have been encoded previously by the encoder CO, are identified. In the preferred embodiment, said partitions are blocks which have a square shape and are all the same size. Depending on the size of the image, which is not necessarily a multiple of the size of the blocks, the last blocks to the left and the last blocks at the bottom are able to not be square-shaped. In an alternative embodiment, the blocks can be for example of rectangular size and/or not aligned with one another.

Each block or macroblock can moreover be itself divided into subblocks which are themselves subdividable.

Such an identification is executed by a stream analysis software module EX_DO, as represented in FIG. 4.

During a step D1 represented in FIG. 3, the module EX_DO in FIG. 4 selects as current block $B_i$ the first block $B_1$ to be decoded. Such a selection consists for example in placing a read pointer in the signal F at the start of the data items of the first block $B_1$.

Then the decoding of each of the selected encoded blocks is carried out.

In the example represented in FIG. 3, such a decoding is applied successively to each of the encoded blocks $B_1$ to $B_Z$. The blocks are decoded for example according to a raster scan, which is well known to the person skilled in the art.

The decoding according to the invention is implemented in a decoding software module MD_DO of the decoder DO, as represented in FIG. 4.

During a step D2 represented in FIG. 3, first the entropy decoding of the first current block $B_1$ which has been selected is carried out. Such an operation is carried out by an entropy decoding module DE_DO represented in FIG. 4, for example of the CABAC type. During this step, the module DE_DO carries out an entropy decoding of the digital information items corresponding to the amplitude of each of the encoded coefficients in the list $E_1$ or in the modified list $Em_1$. At this stage, only the signs of the coefficients in the list $E_1$ or in the modified list $Em_1$ are not decoded.

During a step D3 represented in FIG. 3, the number of signs capable of having been hidden during previous entropy encoding step C20 is determined. Such a step D3 is executed by a processing software module MTR_DO, as represented in FIG. 4. Step D3 is similar to previously mentioned step C7 for determining the number of signs to be hidden.

In the preferred embodiment, the number of hidden signs is one or zero. Additionally, in accordance with said preferred embodiment, it is the sign of the first non-zero coefficient which is hidden. In the example represented, it is therefore the positive sign of the coefficient $\varepsilon 2 = +9$.

In an alternative embodiment, the number of hidden signs is either zero, one, two, three or more.

In accordance with the preferred embodiment of step D3, during a first substep D31 represented in FIG. 3, a sublist containing coefficients $\varepsilon'1, \varepsilon'2, \ldots, \varepsilon'M$ where M<L which are capable of having been modified at the encoding is determined from said list $E_1$ or from the modified list $Em_1$.

Such a determination is performed the same way as in previously mentioned encoding step C7.

Like the previously mentioned processing module MTR_CO, the processing module MTR_DO is initially configured to not modify:
- the zero coefficient or coefficients located before the first non-zero coefficient,
- and for reasons of computation complexity, the zero coefficient or coefficients located after the last non-zero coefficient.

In the example represented, at the end of substep D31, there is the sublist $SEm_1$ such that $SEm_1 = (9, -6, 0, 0, 1, 0, -1, 2, 0, 0, 1)$. Consequently, eleven coefficients capable of having been modified are obtained.

During a next substep D32 represented in FIG. 3, the processing module MTR_DO proceeds with the comparison of the number of coefficients capable of having been modified with a predetermined threshold TSIG. In the preferred embodiment, TSIG has the value 4.

If the number of coefficients capable of having been modified is less than the threshold TSIG, then during a step D4 represented in FIG. 3, a conventional entropy decoding of all the signs of the coefficients in the list $E_1$ is carried out. Such a decoding is executed by the CABAC decoder, denoted by the reference DE_DO in FIG. 4. To this end, the sign of each non-zero coefficient in the list $E_1$ is entropically decoded.

If the number of coefficients capable of having been modified is greater than the threshold TSIG, then during said step D4, a conventional entropy decoding of all the signs of the coefficients in the list $Em_1$ is carried out, with the exception of the sign of the first non-zero coefficient $\varepsilon 2$.

During a step D5 represented in FIG. 3, the processing module MTR_DO calculates the value of a function f which is representative of the coefficients in the sublist $SEm_1$ so as to determine whether the calculated value is even or odd.

In the preferred embodiment where only one sign is hidden in the signal F, the function f is the parity of the sum of the coefficients in the sublist $SEm_1$.

In accordance with the convention used at the encoder CO, which is the same at the decoder DO, an even value of the sum of the coefficients in the sublist $SEm_1$ means that the sign of the first non-zero coefficient in the modified list $Em_1$ is positive, while an odd value of the sum of the coefficients in the sublist $SEm_1$, means that the sign of the first non-zero coefficient in the modified list $Em_1$ is negative.

In the example embodiment in which $SEm_1 = (+9, -6, 0, 0, +1, 0, -1, +2, 0, 0, +1)$, the total sum of the coefficients is equal to 6, and is therefore even. Consequently, at the end of step D5, the processing module MTR_DO deduces therefrom that the hidden sign of the first non-zero coefficient $\varepsilon 2$ is positive.

During a step D6 represented in FIG. 3, and with the aid of all the reconstructed digital information items during steps D2, D4 and D5, the quantized coefficients of the block $Bq_1$ are reconstructed in a predefined order. In the example represented, this is an inverse zigzag scan with respect to the zigzag scan carried out during previously mentioned encoding step C6. Such a step is executed by a read software module ML_DO, as represented in FIG. 4. More specifically, the module ML_DO proceeds to include the coefficients of the list $E_1$ (one-dimensional) in the block $Bq_1$ (two-dimensional), using said inverse zigzag scan order.

During a step D7 represented in FIG. 3, the quantized residual block $Bq_1$ is dequantized according to a conventional dequantization operation which is the inverse operation of the quantization performed at previously mentioned encoding step C5, in order to produce a decoded dequantized block $BDq_1$. Such a step is executed by means of a dequantization software module MDQ_DO, as represented in FIG. 4.

During a step D8 represented in FIG. 3, the inverse transformation of the dequantized block $BDq_1$ is carried out, which is the inverse operation of the direct transformation performed at the encoding at previously mentioned step C4. A decoded residual block $BDr_1$ is hence obtained. Such an operation is executed by an inverse-transform software module MTI_DO, as represented in FIG. 4.

During a step D9 represented in FIG. 3, the predictive decoding of the current block $B_1$ is carried out. Such a predictive decoding is conventionally carried out by known intra and/or inter prediction techniques, during which the block $B_1$ is predicted with respect to the at least one previously decoded block. Such an operation is carried out by a predictive decoding module PRED_DO as represented in FIG. 4.

Needless to say other intra prediction modes as proposed in the H.264 standard are possible.

During this step, the predictive decoding is carried out using decoded syntax elements at the previous step and notably comprising the type of prediction (inter or intra), and if necessary, the intra prediction mode, the type of partitioning of a block or macroblock if the latter has been subdivided, the reference image index and the motion vector which are used in the inter prediction mode.

Said abovementioned predictive decoding step provides for constructing a predicted block $Bp_1$.

During a step D10 represented in FIG. 3, the decoded block $BD_1$ is constructed by adding the decoded residual block $BDr_1$ to the predicted block $Bp_1$. Such an operation is executed by a reconstruction software module MR_DO represented in FIG. 4.

During a step D11 represented in FIG. 3, the decoding module MD_DO tests whether the current decoded block is the last block identified in the signal F.

If the current block is the last block in the signal F, then during a step D12 represented in FIG. 3, the decoding method is ended.

If this is not the case, the next block B; is selected, to be decoded in accordance with the order of the previously mentioned raster scan, by repeating steps D1 to D10, for $1 \leq i \leq Z$.

There will now be described, mainly with reference to FIG. 3, another embodiment of the invention.

This other embodiment is distinguished from the previous one only by the number of hidden coefficients which is either 0, or N, where N is an integer such that $N \geq 2$.

To this end, previously mentioned comparison substep D32 is replaced by substep D32a represented in dotted-line in FIG. 3, during which the number of coefficients capable of having been modified is compared with several predetermined thresholds $0 < TSIG\_1 < TSIG\_2 < TSIG\_3 \ldots$, in such a way that if the number of said coefficients is between TSIG_N and TSIG_N+1, N signs have been hidden.

If the number of said coefficients is less than the first threshold TSIG_1, then during previously mentioned step D4, the conventional entropy decoding of all the signs of the coefficients in the list $E_1$ is carried out. To this end, the sign of each non-zero coefficient in the list $E_1$ is entropically decoded.

If the number of said coefficients is between the threshold TSIG_N and TSIG_N+1, then during previously mentioned step D4, the conventional entropy decoding of all the signs of the coefficients in the list $E_1$ is carried out, with the exception of the N respective signs of the first non-zero coefficients in said modified list $Em_1$, said N signs being hidden.

In this other embodiment, the processing module MTR_DO calculates, during step D5, the value of the function f which is the modulo $2^N$ remainder of the sum of the coefficients in the sublist $SEm_1$. It is assumed in the proposed example that N=2.

The processing module MTR_DO hence deduces therefrom the configuration of the two hidden signs which are assigned to each of the two first non-zero coefficients ε2 and ε3 respectively, according to the convention used at the encoding.

Once these two signs have been reconstructed, steps D6 to D12 described above are carried out.

It goes without saying that the embodiments which have been described above have been given purely by way of indication and are not at all limiting, and that a number of modifications can easily be brought about by the person skilled in the art without thereby departing from the scope of the invention.

Thus for example, according to a simplified embodiment with respect to that represented in FIG. 1, the encoder CO could be configured to hide at least N' predetermined signs, where $N' \geq 1$, instead of either zero, one or N predetermined signs. In that case, comparison step C72 or C72a would be removed. In a corresponding way, according to a simplified embodiment with respect to that represented in FIG. 3, the decoder DO would be configured to reconstruct N' predetermined signs instead of either zero, one or N predetermined signs. In that case, comparison step D32 or D32a would be removed.

Additionally, the decision criterion applied at encoding step C72 and at decoding step D32 could be replaced by another type of criterion. To this end, instead of comparing the number of modifiable coefficients or the number of coefficients capable of having been modified with a threshold, the processing module MTR_CO or MTR_DO could apply a decision criterion which is a function of the sum of the amplitudes of the coefficients that are modifiable or capable of having been modified, respectively, or of the number of zeros present among the coefficients that are modifiable or capable of having been modified, respectively.

The invention claimed is:

1. A method for decoding a sign-data-hiding enabled partition of an image, the method comprising:
   receiving a set of context-based adaptive binary arithmetic coding (CABAC) encoded coefficients from an encoder;
   decoding the set of CABAC encoded coefficients to generate a set of coefficients representing a residual block for the sign-data-hiding enabled partition, the set of coefficients including a first non-zero coefficient that is without a sign designation;
   applying a function to the set of coefficients to generate sign data, wherein applying the function to the set of coefficients comprises:
   computing a sum of modifiable coefficients in the set of coefficients, wherein the modifiable coefficients include a first non-zero coefficient according to an inverse scan order of the residual block, a last non-zero coefficient according to the inverse scan order of the residual block, and coefficients between the first and the last non-zero coefficients; and
   computing remainder data based on a division between the sum and a specific number;
   designating a sign for the first non-zero coefficient based on the sign data, wherein designating the sign for the first non-zero coefficient comprises:
   designating the sign for the first non-zero coefficient based on the remainder data;
   dequantizing the set of coefficients including the first non-zero coefficient with the designated sign to generate a dequantized block of coefficients; and
   inverse transforming the dequantized block of coefficients to generate a residual block.

2. The method of claim 1, wherein the modifiable coefficients are greater than zero.

\* \* \* \* \*